United States Patent Office 3,798,104
Patented Mar. 19, 1974

3,798,104
GAS ACTIVATED BONDING OF UNDRAWN POLYAMIDE ARTICLES
William C. Mallonee, Atlanta, and Henry E. Harris, Savannah, Ga., assignors to Monsanto Company, St. Louis, Mo.
Continuation-in-part of abandoned application Ser. No. 1,477, Jan. 8, 1970, which is a continuation-in-part of application Ser. No. 737,507, May 17, 1968, now Patent No. 3,516,900, which in turn is a continuation-in-part of abandoned application Ser. No. 528,699, Feb. 16, 1966. This application Dec. 2, 1971, Ser. No. 203,957
Int. Cl. B29d 27/08; C09j 5/02
U.S. Cl. 156—306    5 Claims

ABSTRACT OF THE DISCLOSURE

Touching polyamide shaped structures, such as granules, products of extrusion and the like are autogenously bonded together along their contiguous surfaces by the absorption and subsequent desorption of an activating gas such as a hydrogen halide to form products including porous pellicles, substantially seamless articles and the like.

---

This application is a continuation-in-part of copending application Ser. No. 1,477, filed Jan. 8, 1970 and now abandoned, which is a continuation-in-part of Ser. No. 737,507, now U.S. 3,516,900, which is a continuation-in-part of Ser. No. 528,699, filed Feb. 16, 1966, now abandoned.

This invention relates to a method of autogenously bonding polyamide shaped structures and particularly, to the preparation of substantially seamless articles from two or more molded polyamide parts.

Heretofore polyamide structures have been bonded by the use of external binders or by softening the filaments with heat, solvent, or plasticizer and subjecting them to pressure while in the softened state. The external binder may be an adhesive substance which is cured after the application thereof, or it may be rendered adhesive after application by use of heat, solvent or plasticizer. External binders may be applied as powder, solutions or emulsions; however, these methods suffer from several disadvantages. The use of an outside binder presents problems in uniform application and limits the properties of the polyamide article to those of the binder. Thus, for example, if the bonding material has a low melting point, the temperature conditions to which the polyamide articles may be subjected are limited by the melting point of the binder.

It is a primary object of the present invention to provide bonded polyamide structures and blends thereof which are free from external bonding agents and visible polymer migration at the bond points.

Another object of this invention is to bond shaped polyamide structures being free of external bonding agents in the final product, without altering the geometry of the structures and without visibly building up an excess of the polymer at the bond points.

Yet another object is to bond touching polyamide granules together by means of an activating gas to form a porous board.

In its broadest aspect, the present invention comtemplates the bonding of two touching polyamide articles at their contiguous surfaces by exposure to an activator such as a gaseous hydrogen halide followed by removal of the activating gas. The activator gas can be removed or desorbed either by washing in a neutral or slightly basic water bath or by heating to temperatures above about 90° C. Hydrogen chloride is the preferred activating gas because of its faster absorption and desorption rate and comparative ease of handling. For brevity and convenience, hydrogen chloride gas will be referred to as the activating gas in describing the invention herein. Preferably, the activating gas should be maintained at about 20 to 25° C. for uniform treating conditions and handling convenience although bonding can be accomplished at substantially higher and lower temperatures. The absorption rate is a function of the temperature with faster absorption occurring at elevated temperatures, that is, temperatures above 0° C. It has been found however, that the amount of activating gas absorbed decreases with a corresponding increase in temperature until no absorption at all takes place when the temperature exceeds approximately 110° C.

While aqueous solutions of hydrogen chloride (hydrochloric acid) are known solvents for many polyamides, substantially unionized pure hydrogen chloride is not a solvent, and the process of this invention may be carried out under totally anhydrous conditions, indicating that the bonding process is not dependent upon solution and reprecipitation of polymer. Further, polymers other than polyamides which are also soluble in hydrochloric acid do not undergo this bonding reaction when subjected to gaseous hydrogen chloride in accordance with the techniques of this invention. To obtain this bonding reaction, the structures must be touching. In the case of touching, it may be desirous to place the same under compression to insure adequate contact.

The discovery has been made that polymers which can be self-bonded under the influence of hydrogen chloride gas (HCl) have in common in their structure the —NHCO— group. In order to exhibit this bonding property, the polymer needs an adequate concentration of these groups which are accessible and attached to groups which do not alter basicity unfavorably. It has been found that polyamides containing some aromatic groups will undergo this bonding reaction, but certain wholly aromatic polyamides do not undergo the reaction despite concentrations of —NHCO— groups comparable to that in polyhexamethylene adipamide (nylon 66) which bonds very easily. This may result from the rigidity of the structure or from the effect of the aromatic rings on the basicity of the amide group or from a combination of these effects. It has also been found that polyamide articles containing high solvent concentrations do not satisfactorily undergo the bonding reaction even though the articles rapidly absorb the hydrogen chloride gas.

While the mechanism of the bonding is not completely understood, it is belived that it is based on disruption of hydrogen bonds between the polymer chains by formation of an HCl complex with the amide group. In the polymer art, it is well known that many of the physical properties of polyamides depend to a great extent on the intermolecular hydrogen bonds between the —CO— and —NH— groups in adjacent polymer chains. The bonds form cross links between the molecular chains, increasing such properties as melting points and tensile strengths. When these bonds are disrupted by the action of the hydrogen chloride, the polymer chains within the structure become more flexible and tend to shift to relieve the stress caused by tension or pressure on the structure. The complex formation is reversible and when the hydrogen chloride is desorbed, the hydrogen bonds reform. In the shifted position of the polymer chains, many of the new bonds are formed between chains in two different structures. Two different polyamides which are self-bonding can be bonded to one another. Bonding is accomplished with exposure times which may vary from 1 second to several minutes, depending on composition and structure of the materials to be bonded. Effective bonding has been achieved with concentrations of HCl ranging from 100% to 25% mixtures with air. By regulation of exposure time, depth of penetration of the gas into the individual polyamide granule or article can easily be controlled and limited to the depth necessary to obtain desired bonding. In practice, good bonding has been achieved with penetrations as low as 5% of the cross-sectional area but penetration of between 20 and 50 percent is preferred. Optimum time of exposure varies with the polymer composition, the concentration of the activating gas and the articles' total mass. In general, smaller articles, because of greater surface area per unit weight, will require a shorter time of exposure than will larger articles from the same polymer composition.

Desorption of the activating gas may be achieved at room temperature by washing with water or a very dilute aqueous solution of a base, or it may be achieved under completely anhydrous conditions by application of heat. The latter method offers the advantage of simpler recovery of the activating gas. Temperatures necessary for desorption are, far below the softening or melting temperatures of the polymers and therefore do not alter the physical properties of the polymeric structures.

For a better understanding of the present invention, reference should be made to the accompany drawing in which.

Figures 1, 2:
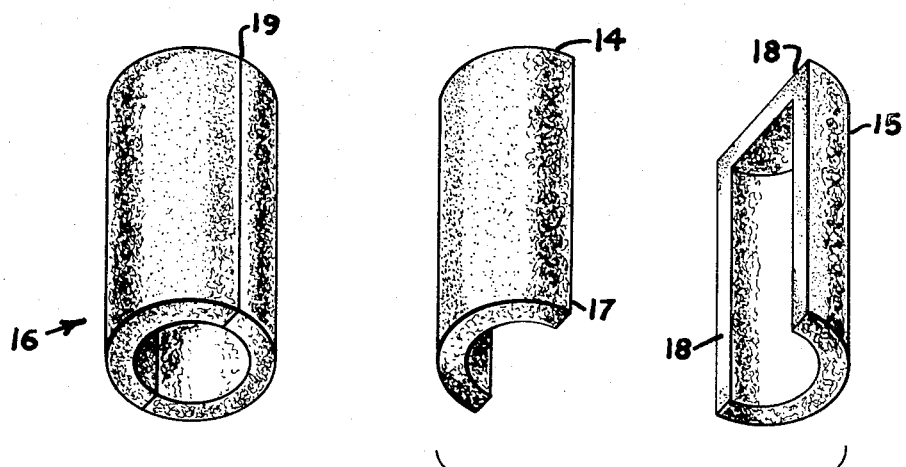
FIG. 1 is a perspective view of two polyamide molded elements joined together in accordance with the process of this invention to form a closed end tubular article.
FIG. 2 is an exploded view of the elements of FIG. 1.

Granules and articles, bonded by this process are characterized by a structure in which bonded intersections are not visible distinguishable from non-bonded areas even at high magnifications. There is no visible migration of polymer as in known solvent bonding processes. Another important characteristic of the polyamides bonded by the technique of this invention is the fact that a strong and flexible bond can be obtained with less than 1 micron of penetration of the activating gas into the article.

In a preferred embodiment of this invention a filter is prepared by grinding nylon, such as nylon 6,6 polymer flake which may be purchased from Monsanto Company, Pensacola, Fla., to a particle size necessary for removing a given particulate from a fluid. The nylon particles are then placed in a press and are subjected to a hydrogen halide gas such that the gas is absorbed by the nylon particles at least along their exposed surface. The absorption of the gas by the nylon particles renders the particles bondable and, while in that state, a degree of pressure is exerted on the particle mass by the mold. The force applied to the particle mass insures intimate contact between adjacent particles and acts along with the particle size and filter thickness to control the pressure drop through the thickness of the filter. In other words, fluid permeability of the filter is, in part, determined by the pressure exerted by the mold on the particle mass while the nylon particles are in a bondable state. It is contemplated that the filters of this invention will have an air permeability of from 10 to 100 ft.$^3$/min./ft.$^2$ at 0.5 in of water pressure. Below 10, the filter is too dense for the passage of fluid therethrough and, above 100, the nylon particles are too sparsely separated to be effective. A relatively rigid filter which is comprised of the bonded nylon particles is formed by removing or desorbing the gas from the particles. Desorption may be accomplished by heating the mold to a temperature in excess of 100° F. or by removing the particle mass from the mold and by washing the same in water or some slightly basic solution. Also, the gas may be desorbed from the particle mass by placing the same in an oven as mentioned above.

In another preferred embodiment of this invention, the two components of a nylon bifurcated molded article are joined together by the absorption and subsequent desorption of the hydrogen halide activating gas as described above. Molded nylon components of the type contemplated are especially difficult to join together by the conventional methods such as heating the mating surfaces or glueing. Glueing is almost impossible due to nylon's low coefficient of friction and heating produces a disproportionally large seam which is generally non-uniform and weak. In the heat bonding of nylon articles, the edges of the articles are heated until the nylon polymer becomes soft and tacky whereupon the articles are joined with a degree of pressure. Since the polymer is soft, any force thereon will cause a polymer flow which is evidenced by the bulge at the seam. For many end uses, these seams must be removed by machining. Other problems are also encountered. For example, if the article is exposed to the localized heat source for too long of a time, the entire article will deform. Similarly, if the article is underheated, inadequate bonding will occur.

EXAMPLE I

Figures 3, 4:
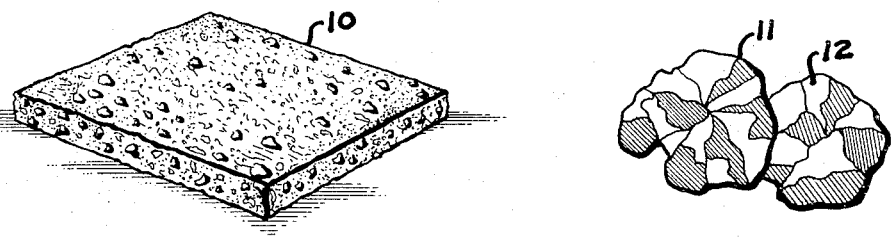
FIG. 3 is a perspective view of porous board useful as a filter element comprised of polyamide granules.
FIG. 4 is an enlarged perspective view of two granules a plurality of which comprise the porous board as shown in FIG. 3 which are bonded together in accordance with the process of this invention.

As shown in FIG. 3, filter 10 which is comprised of a plurality of small nylon particles 11 and 12 which are bonded together as shown in FIG. 4 was prepared by grinding nylon 6,6 polymer flakes until the resultant particles were able to be passed through a Sieve No. 7 wire grid (U.S. Bureau of Standards Sieve Series). The grid was comprised of 0.036 inch diameter wire having 6.80 meshes per inch with sieve openings of 0.111 inch. The ground flake was placed in a mold and was thoroughly contacted with hydrogen chloride gas for a period of five minutes, the nylon particles absorbing quantities of hydrogen chloride gas. While the gas remained absorbed in the nylon particles, pressure of 100 lbs./in.$^2$ was exerted on the particle mass and the mold was then heated to 150° F. to drive out the absorbed hydrogen chloride gas which results in the bonding of the touching nylon particles together. After being subjected to the elevated temperature for five minutes, the molded filter is removed from the mold. The filter had an air permeability of about 25 ft.$^3$/min./ft.$^2$ at 0.5 inch of water pressure. The filter was ⅜ inch thick and had a density of about 0.75 gm./cm.$^3$.

EXAMPLE II

Halves 14 and 15 of bifurcated nylon 6 article 16 were bonded together along surfaces 17 and 18, respectively. Halves 14 and 15 were subjected to hydrogen halide gas for 10 minutes to provide for gas absorption after which they were forced together such that surface 18 of half 15 was contiguous with surface 17 of half 14. A force of 20 lbs./in.$^2$ of surface (18 and 17) area was applied and was maintained during desorption of the gas from the nylon. Desorption was completed by immersing article 16 in water for a period of 10 minutes. Seam 19 formed at the function of surfaces 17 and 18 was barely visible.

The strength of bonded seam 19 was tested by placing said seam under tension. It was found that the strength of the seam was approximately 25% of the strength of the nylon walls comprising halves 14 and 15.

EXAMPLE III

The procedure of Example II was repeated with the exceptions that halves 14 and 15 were subjected to air having a relative humidity of 95% for 20 minutes and that the desorption bath was heated to a temperature of 150° F. The seam strength was found to be 30% of the strength of the nylon walls. It was believed that associating moisture with the nylon prior to gasing aided gas absorption by the nylon. The increase in temperature of the water desorption bath hastened the rate of gas desorption from the nylon but did not measurably increase seam tensile strength.

What we claim is:

1. A process for bonding nylon articles together along contiguous surfaces comprising the steps of:
   (a) providing discrete articles of undrawn nylon;
   (b) contacting said nylon articles with a hydrogen halide gas at a temperature being less than 100° F., said nylon articles absorbing quantities of said gas at least along the exposed surfaces thereof;
   (c) forcing said nylon articles into intimate contact while said gas remains absorbed in said nylon articles, and;
   (d) autogenous bonding said nylon articles together along their contiguous and touching surfaces by desorbing said gas from said nylon articles.

2. The process of claim 1 wherein said hydrogen halide gas is hydrogen chloride gas.

3. The process of claim 2 wherein said discrete articles are molded shapes to be joined together along selected surfaces to form a seam, said seam being comprised wholly of nylon polymer.

4. The process of claim 2 wherein said discrete articles are granules compacted together and bonded along contiguous and touching surfaces to form a porous filter.

5. The process of claim 4 wherein the force of compaction was sufficient to provide said filter with an air permeability of from 10 to 100 ft.$^3$/min./ft.$^2$ at 0.5 inch of water.

References Cited
UNITED STATES PATENTS

| | | | |
|---|---|---|---|
| 2,876,524 | 3/1959 | Reyerson et al. | 264—83 X |
| 3,075,823 | 1/1963 | Reyerson et al. | 8—115.5 |
| 3,514,360 | 5/1970 | Crowley | 156—308 |
| 3,471,603 | 10/1969 | Patrick et al. | 264—118 |

ALFRED L. LEAVITT, Primary Examiner

R. A. DAWSON, Assistant Examiner

U.S. Cl. X.R.

55—524; 156—307, 308; 161—170, 227; 264—83, 123